United States Patent
Conner et al.

(10) Patent No.: US 6,718,515 B1
(45) Date of Patent: Apr. 6, 2004

(54) METHOD OF POPULATING A DYNAMIC HTML TABLE FROM A SET OF DATA OBJECTS THROUGH A COMMON INTERFACE

(75) Inventors: Michael Haden Conner, Austin, TX (US); Matthew Dale McClain, Austin, TX (US); Lin Xu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,711

(22) Filed: Dec. 7, 1999

(51) Int. Cl.$^7$ .............................................. G06F 15/00
(52) U.S. Cl. .................... 715/509; 715/513; 707/103 R
(58) Field of Search .............................. 715/509, 503, 715/504, 500.1, 501.1, 513; 707/103 R; 709/328, 331, 332; 717/116; 345/700

(56) References Cited

U.S. PATENT DOCUMENTS

| | | | |
|---|---|---|---|
| 5,761,673 A | * | 6/1998 | Bookman et al. ............ 709/311 |
| 5,915,252 A | * | 6/1999 | Misheski et al. ........ 707/103 R |
| 5,956,736 A | * | 9/1999 | Hanson et al. .............. 715/513 |
| 6,429,880 B2 | * | 8/2002 | Marcos et al. .............. 345/744 |
| 6,449,659 B1 | * | 9/2002 | Caron et al. ................. 709/315 |
| 6,505,343 B1 | * | 1/2003 | Menon et al. .............. 717/116 |

OTHER PUBLICATIONS

Eduardo Peligri-Lopart et al., Java Server Pages™ Specification, Version 1.1—Public Release (Sun Microsystems) Aug. 18, 1999, Chapter 1.*

World-Wide Web Consortium, HTML 4.0 Specification, W3C Recommendation, revised on Apr. 24, 1998, pp. 101–132.*

Scot Johnson et al., Special Edition Using Active Server Pages, Chapter 20, Section enititled "Creating a Simple Data-Driven ASP Program" (Que: 1997).*

Sun Microsystems, Inc., JDBC Technology, Aug. 18, 1999, downloaded on Mar. 26, 2003 from http://web.archive.org/web/19990819005342/java.sun.com/products/jdbc/.*

Sun Microsystems, Inc., JDBC Technology—Features, Aug. 25, 1999, downloaded on Mar. 26, 2003 from http://web.archive.org/web/19991008111305/java.sun.com/products/jdbc/features.html.*

* cited by examiner

Primary Examiner—Sanjiv Shah
Assistant Examiner—Maikhanh Nguyen
(74) Attorney, Agent, or Firm—Marilyn S. Dawkins; Joseph R. Burwell

(57) ABSTRACT

A method operative at a server in response to a client browser request for generating a table having dynamic data. The method begins by instantiating a table format object with dynamic data extracted from one of a set of data objects through a common interface. The common interface enables page developers to author customized data getter objects that are used to access data in the set of data objects. The dynamic data extracted from the given data object through the common interface is formatted into the table according to the table format object. The resulting table with dynamic data is then served back to the requesting client browser.

18 Claims, 9 Drawing Sheets

FIG. 5A

| ItemWithdrawal | ItemBalance | ItemDeposit | ItemAmount | ItemDate |
|---:|---:|---:|---:|:---|
| $0.00 | $1,000.00 | $1,000.00 | $1,000.00 | January 23, 1998 |
| $33.27 | $966.73 | $0.00 | ($33.27) | July 6, 1998 |
| $0.00 | $967.35 | $0.62 | $0.62 | July 6, 1998 |
| $21.67 | $945.68 | $0.00 | ($21.67) | July 6, 1998 |
| $0.00 | $946.35 | $0.66 | $0.66 | July 6, 1998 |
| $0.00 | $947.10 | $0.75 | $0.75 | July 6, 1998 |
| $0.00 | $947.88 | $0.78 | $0.78 | July 6, 1998 |

FIG. 5B

| Withdrawal | Balance | Deposit | Amount | Date |
|---:|---:|---:|---:|:---|
| $0.00 | $1,000.00 | $1,000.00 | $1,000.00 | 1/23/98 |
| $33.27 | $966.73 | $0.00 | ($33.27) | 7/6/98 |
| $0.00 | $967.35 | $0.62 | $0.62 | 7/6/98 |
| $21.67 | $945.68 | $0.00 | ($21.67) | 7/6/98 |
| $0.00 | $946.35 | $0.66 | $0.66 | 7/6/98 |
| $0.00 | $947.10 | $0.75 | $0.75 | 7/6/98 |
| $0.00 | $947.88 | $0.78 | $0.78 | 7/6/98 |

FIG. 6A

| Withdrawal | Balance | Deposit | Amount | Date |
|---:|---:|---:|---:|:---|
| $0.00 | $1,000.00 | $1,000.00 | $1,000.00 | January 23, 1988 |
| $32.68 | $967.32 | $0.00 | ($32.68) | February 1, 1998 |

DEFAULTHEADER_TABLESTYLE

FIG. 6B

| $32.68<br>$0.00 | $967.32<br>$1,000.00 | $0.00<br>$1,000.00 | ($32.68)<br>$1,000.00 | February 1, 1998<br>January 23, 1988 |
|---|---|---|---|---|
| Withdrawal | Balance | Deposit | Amount | Date |

BOTTOMHEADER_TABLESTYLE

FIG. 6C

| Withdrawal | $0.00 | $32.68 |
| Balance | $1,000.0 | $967.32 |
| Deposit | $1,000.0 | $0.00 |
| Amount | $1,000.0 | ($32.68) |
| Date | January 23, 1998 | February 1, 1998 |

LEFTHEADER_TABLESTYLE

FIG. 6D

| $32.68<br>$967.32<br>$0.00<br>($32.68)<br>February 1, 1998 | $0.00<br>$1,000.0<br>$1,000.0<br>$1,000.0<br>January 23, 1998 | Withdrawal<br>Balance<br>Deposit<br>Amount<br>Date |
|---|---|---|

RIGHTHEADER_TABLESTYLE

FIG. 7

| TableInfo | ColumnProperty | ColumnProperty | ColumnProperty |
|---|---|---|---|
| HeaderRow | HeaderName | HeaderName | HeaderName |
| Row | dynamic data | dynamic data | dynamic data |
| Row | dynamic data | dynamic data | dynamic data |
| Row | dynamic data | dynamic data | dynamic data |

Table Format Bean Customizer — File Add/Remove

FIG. 8

| TableInfo | ItemLabel | itemWithdrawal | itemDeposit | itemDate |
|---|---|---|---|---|
| HeaderRow |  | Withdrawal | Deposit | Date |
| Row | dynamic data | dynamic data | dynamic data | dynamic data |
| Row | dynamic data | dynamic data | dynamic data | dynamic data |
| Row | dynamic data | dynamic data | dynamic data | dynamic data |

Table Format Bean Customizer — File Add/Remove

FIG. 9

Netscape — File Edit View Go Communicator Help

Bookmarks   Go to: http://localhost/devcon.jsp

|  | 0 | 1 | 2 | 3 | 4 |
|---|---|---|---|---|---|
| Withdrawal | $181.26 | $69.05 | $37.63 | $85.08 | $24.90 |
| Deposit | $171.96 | $121.47 | $62.53 | $52.42 | $178.61 |
| Date | 31-Jan-99 | 01-Feb-99 | 02-Feb-99 | 03-Feb-99 | 04-Feb-99 |

Document: Done

Table Format Attributes Position Chart

< TABLE tableAttributes > tablePrefix
< TH headerAttributes > headerPrefix Headers headerSuffix < /TH >
< TR rowAttributes > rowPrefix

......

< TR cellAttributes columnAttributes > columnPrefix cellPrefix Data cellSuffix columnSuffix < /TD >

......

rowSuffix < /TR >
< CAPTION captionAttributes > captionPrefix Caption captionSuffix < /CAPTION > tableSuffix < /TABLE >

All attributes, prefixes, and suffixes are associates with an individual cell in order to achieve a great flexibility for table rotation, e.g.,
< TD cellAttributes columnAttributes rowAttributes >
rowPrefix columnPrefix cellPrefix Data rowSuffix columnSuffix cellSuffix < /TD >

One can override the methods below according to a data bean object:
? getRowPrefix/Suffix(int order[] ...)
? getColumnPrefix/Suffix(int order[] ...)
? getCellPrefix/Suffix(int order[] ...)

Parameter order is an int array with size 3. This be used to position row prefix, column prefix, cell prefixs around an individual cell.
? order[0] respents a row prefix position.
? order[1] respents a column prefix position..
? order[2] respents a cell prefix position.

The default values are order[0] = 0, order[1] = 1, and order[2] = 2.
In HTML page, it looks likes
"... rowPrefix columnPrefix cellPrefix Data ....".
If order[0] = 2, order[1] = 0, and order[2] = 1, then it will
"..... columnPrefix cellPrefix rowPrefix Data....".
If there is a conflict, the last prefix wins.

FIG. 10

| All Packages | Class Hierarchy | This Package | Previous | Next | Index |

Class com.ibm.jsp.customizer.ColumnCellObject java.lang.Object

----java.awt.Component

----com.ibm.jsp.customizer.TableCellObject

----com.ibm.jsp.customizer.ColumnCellObject public class ColumnCellObject
extends TableCellObject

Constructor Index

- ColumnCellObject()

Method Index

- getColumnPropertyMethod()
- getColumnPropertyName()
- getDataObject()
- getFormatBean()
- setColumnPropertyMethod(Method)
- setColumnPropertyName(String)
- setDataObject(String)
- setDefaultValue()
- setFormatBean(String)

Constructors

- ColumnCellObject public ColumnCellObject()

FIG. 11

METHODS

- getColumnPropertyMethod public Method getColumnPropertyMethod()

- setColumnPropertyMethod public void setColumnPropertyMethod (Method columnPropertyMethod)

- getDataObject public String getDataObject()

- setDataObject public void setDataObject (String dataObject)

- getColumnPropertyName public String getColumnPropertyName ()

- setColumnPropertyName public void setColumnPropertyName (String columnPropertyName)

- getFormatBean public String getFormatBean()

-setFormatBean public void setFormatBean (String formatBeanName)

-setDefaultValue public void setDefaultValue()

> OVERRIDES:
> setDefaultValue in class TableCellObject

All Packages    Class Hierarchy    This Package    Previous    Next    Index

*FIG. 12*

METHOD OF POPULATING A DYNAMIC HTML TABLE FROM A SET OF DATA OBJECTS THROUGH A COMMON INTERFACE

CROSS-REFERENCE TO RELATED APPLICATIONS

The present application is related to the following copending U.S. patent applications Ser. No. 09/455,710, entitled "CONDITIONAL HIGHLIGHTING OF GIVEN CELLS IN A DYNAMIC HTML TABLE" filed, Dec. 7, 1999; Ser. No. 09/455,709, entitled "METHOD FOR PROVIDING A VISUAL REPRESENTATION OF DYNAMIC HTML TABLE ATTRIBUTES" filed, Oct. 7, 1999; and Ser. No. 09/455,713, entitled "METHOD FOR ROTATING A DYNAMIC HTML TABLE" filed, Dec. 7, 1999.

BACKGROUND OF THE INVENTION

1. Technical Field

The present invention relates generally to Internet publishing technologies and, in particular, to techniques for dynamically serving web pages that include tables populated with dynamic data.

2. Description of the Related Art

Page serving technologies are evolving at a rapid pace. Since 1997, a number of major technologies have attempted to supplement, if not replace, dynamically generated HTML, i.e. database or CGI scripts used to generate a web page on the fly. These technologies are Sun Microsystems's Java Server Page (JSP), Microsoft's Active Server Page (ASP), and the Extensible Style Sheet Language (XSL/XSLT) being promoted by the World Wide Web Consortium (W3C). Such techniques provide for the generation and serving of dynamic web page content by enabling a page creator to write HTML and then to embed pure programming logic inside the page markup. Sun's JSP and Microsoft's ASP are similar in that they both are essentially web templates that enable given code (e.g., code written in Java) to be embedded in static HTML to be served in response to a client browser request.

Although techniques such as JSP and ASP allow page authors to quickly and easily create web pages with dynamically-generated content, these techniques still have limitations. One limitation, in particular, is the inability to format an HTML table from given input data or that exhibits given customization, e.g., the capability to display highlighted cells based on given data conditions or the ability to format the table to facilitate rotation about any row or column. As is well-known, an HTML table consists of headers, rows and columns. A column represents a type of data. A header is used to display proper name for each column. A row is a set of data that consists of one datum from each column.

Thus, for example, generating an HTML table from dynamic data in a Java server page is a complicated task. To produce a formatted table, one must first obtain the data from given input object(s). The way to access the data is different depending on the implementation of those objects. One may implement their input as a JavaBean that uses indexed properties or vanilla properties. Others may implement a series of data beans using a combination of indexed property and property. Additional ways of accessing data might be through an XML document object model (DOM) or a JDBC ResultSet. With all these variations, it is difficult to format an HTML table for a dynamically-generated page wherein input data objects may be retrieved from varying types of input data sources.

Once the dynamic data is obtained, it would also be desirable to format that data within the dynamic HTML table. One such type of formatting is highlighting. As is well-known, it is fairly simple to highlight a given column or row in a dynamically-generated HTML table, and it is also known to highlight a specific cell in a static HTML table. However, there is no known technique for highlighting a given cell in a dynamically-generated table when data in that cell satisfies a given condition. For example, for a bank online statement wherein the information returned to the requesting user is a table, it would be desirable to be able to highlight a given cell to indicate that the user's checking account balance, for example, has fallen below a given amount. Thus, it would be desirable to be able to convert dynamic data (such as the result of a database query) into a formatted tabular representation in which certain table cells are conditionally highlighted based on the characteristics of the dynamic data to be presented in the cell.

Another type of table functionality that is currently unavailable in the art is the ability to produce a single dynamic page that will render a table correctly in any given horizontal or vertical orientation. There are many reasons for rotating a tabular representation in a web page. To give a simple example, some languages, such as Hebrew, are read right-to-left. As another example, assume a table compares the prices of vegetables for five different groceries. Because there are hundreds of vegetable types, the page author will want to be able to rotate the table so that it has five columns but hundreds of rows. When a table is rotated, however, the corresponding attributes in the table should change as well. If there are many attributes in the HTML table, however, there will be significant changes required when the orientation is altered. With a formatted table, a formatter for a column should become a formatter for a row. Implementing formatters for all of the expected orientations, however, is quite difficult.

For a Java programmer who is not an HTML expert, it is not easy to completely understand the behavior of the attributes in a table that is going to be rotated. In the example described above, this is because there are a large number of attributes associated with the HTML table. In the prior art, there is no means available to show the position and precedence of all of these attributes. Although the documentation generated from Java class files contains the HTML table attributes, such documentation does not show any of the relations among the attributes. Thus, for example, a developer has no simple way to determine the behaviors of given attributes or what rule should govern if a behavior conflict occurs.

The present invention addresses these and other deficiencies of the prior art.

BRIEF SUMMARY OF THE INVENTION

The present invention describes a table formatter that is useful in formatting a markup language page table having dynamic data. The table formatter provides a number of useful functions including a raw data acquisition object that enables page developers to access different types of data objects for the table using a common interface, a technique to enable a page developer to specify how to convert dynamic data into a formatted representation in which certain table cells are conditionally highlighted, and a technique to enable the page author to format the table so that the contents of the table are independent of the table's orientation. The table formatter is invoked to enable the page developer to set up properties that will be used to create the dynamic table in response to a client browser request for a page that includes the table. Upon receipt of that request at the server, a request object and a data object are passed into the table formatter to generate the table according to the properties and to populate the table from a data source defined by the raw data acquisition object. As noted above, the dynamically-generated table may include conditionally highlighted cells as well as a defined horizontal or vertical orientation. The page that includes this table is then returned to the requesting browser in the usual manner.

Thus, it is a primary object of the present invention to provide a table formatter that is useful at a server for writing a server page (e.g., using JSP) to produce a dynamic table.

Another more specific object of the invention is to implement a raw data acquisition object to provide an interface that enables third parties to plug-in different types of data objects in the table formatting process irrespective of the type of data or the form in which that data is stored.

According to a preferred embodiment, a method is operative at a server in response to a client browser request for generating a table having dynamic data. The method begins by instantiating a table format object with dynamic data extracted from one of a set of data objects through a common interface. The common interface enables page developers to author customized data getter objects that are used to access data in the set of data objects. The dynamic data extracted from the given data object through the common interface is formatted into the table according to the table format object. The resulting table with dynamic data is then served back to the requesting client browser.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

For a more complete understanding of the present invention and the advantages thereof, reference should be made to the following Detailed Description taken in connection with the accompanying drawings in which:

FIGS. 5A–5B illustrate representative HTML tables illustrating the table cell highlighting function of the present invention;

FIGS. 6A–6D illustrative different versions of a table using the same set of data that may be created using the table format object of the invention;

FIG. 7 illustrates a graphical user interface for a table format object customizer tool of the present invention;

FIG. 8 illustrates a representative state of the customizer tool;

FIG. 9 illustrates the actual dynamic table that is generated based on the customizer tool state illustrated in FIG. 8;

FIG. 10 illustrates a representative table attribute chart; and

FIG. 11 and FIG. 12 illustrate a corresponding portion of the table format object's documentation for the attribute that is displayed as a result of the user linking on the column-Prefix attribute in the table attribute chart in FIG. 10.

DESCRIPTION OF THE PREFERRED EMBODIMENT

Figure 1:
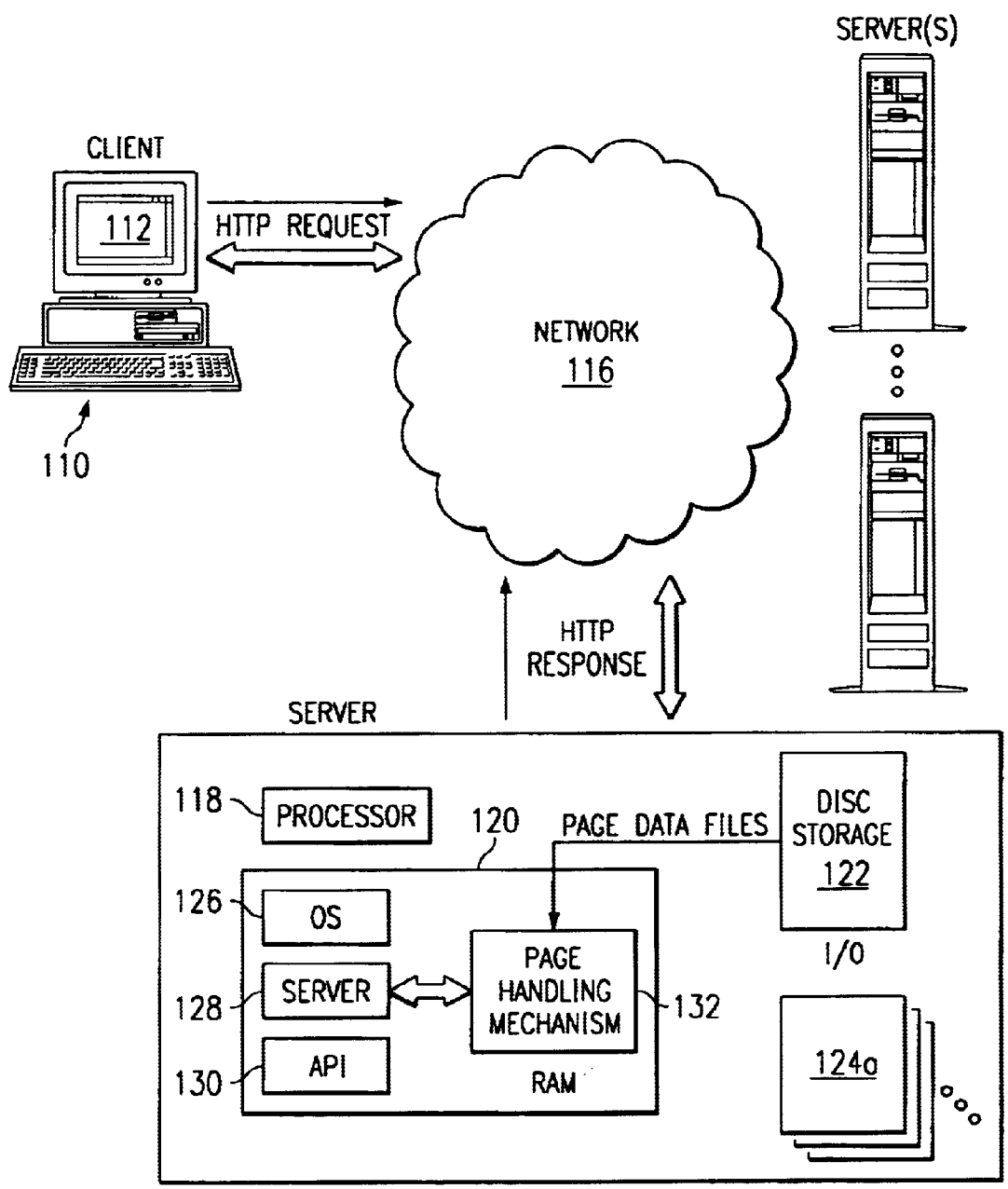
FIG. 1 is a simplified illustration of a client-server environment in which the present invention may be implemented.

The present invention is implemented within a page handling framework and runtime engine operative on a server in a computer network such as the Internet. As is well-known, in the Internet paradigm as illustrated in FIG. 1, a client machine, such as machine 100, may use an application, such as a web browser 102, to access a server 104 via a computer network 106. Network 106 typically includes other servers (not shown) for control of domain name resolution, routing and other control functions. A representative server 104 is a computer or workstation having at least one processor 108, system memory (e.g., RAM) 120, disk or other permanent storage 122, I/O devices 124a–n, an operating system 126, a server program 128, and an application programming interface (API) 130 that provides extensions to enable application developers to extend and/or customize the core functionality thereof through software programs including plug-ins, CGI programs, Java servlets, and the like. One such software program is a .jsp page handling mechanism 132, which processes an HTTP page request and generates a response by feeding data into an output stream as will be described. In an illustrative embodiment, the page handling mechanism is implemented in Java and is executable in a Java Virtual Machine (JVM) by a processor in a known manner. Alternatively, the program may be written in whole or in part in native code. The page handling functionality, of course, may be part of the integral web server program.

A representative server machine is an IBM Netfinity platform running the Unix operating system and a server program such as IBM WebSphere Version 2.0. Of course, any other computer hardware or software may be used.

A representative client is a personal computer, notebook computer, Internet appliance or pervasive computing device (e.g., a PDA or palm computer) that is Pentium-, PowerPC®- or RISC-based. The client includes an operating system such as Microsoft Windows, Microsoft Windows CE or PalmOS. A typical client includes a suite of Internet tools including a Web browser, such as Netscape Navigator or Microsoft Internet Explorer, that has a Java Virtual Machine (JVM) and support for application plug-ins or helper applications. Communications between the client and the server typically conform to the Hypertext Transfer Protocol (Version 1.0 or higher), and such communications may be made over a secure connection.

Figure 2:
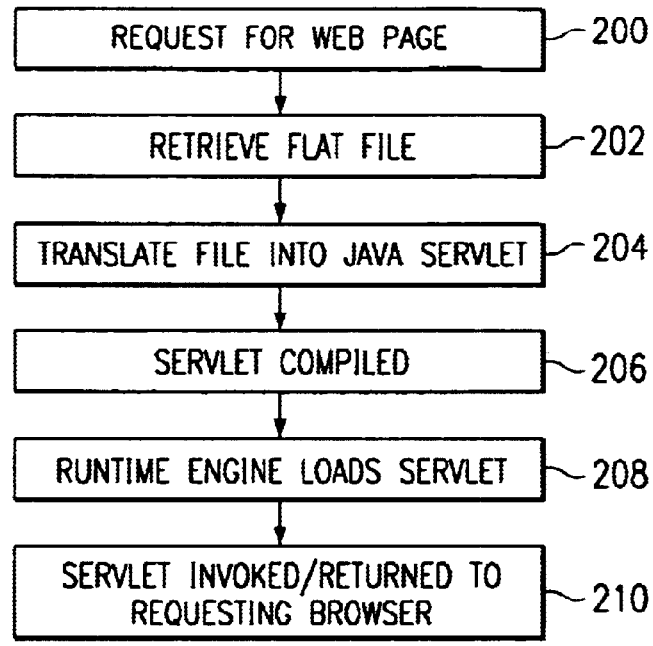
FIG. 2 is a high level flowchart illustrating a known technique for handling a .jsp page request.

FIG. 2 is a flowchart illustrating a known technique for handling a page request in a server operating JSP. JSP technology uses reusable, cross-platform server components (JavaBeans or servlets) written in Java. Java server pages are HTML files written in a combination of industry-standard HTML, JSP HTML tags, and Java as a scripting language. A JSP file has the extension .jsp and calls the reusable components that reside on the server. The routine begins at step 200 upon the receipt of a request for a web page that is received from a requesting client. The requested page is identified by a URL. At step 202, a Java runtime servlet engine responds to the client .jsp request by retrieving a flat file corresponding to the requested page. At step 204, the servlet engine translates the flat file into a Java servlet. The servlet is then compiled at step 206. At step 208, the runtime engine class loads the servlet. At step 210, the servlet is invoked to cause given (e.g., customized) web content to be returned to the requesting browser. This competes the processing.

Figure 3:
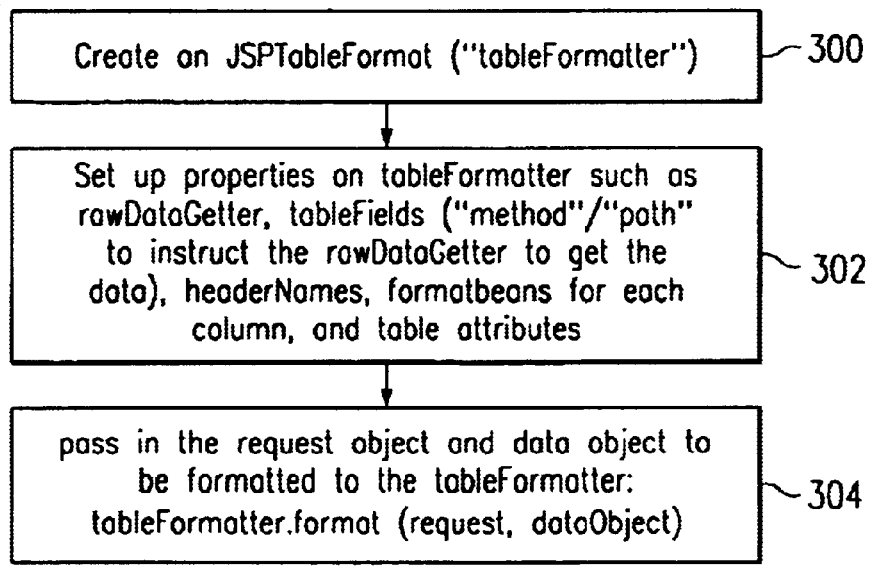
FIG. 3 is a high level flowchart illustrating a preferred method of the present invention for creating and using a table format object to generate a dynamic HTML table.

FIG. 3 is a flowchart illustrating the basic functionality of the present invention for creating a table format object and using that object to generate an HTML table as a dynamic page is served in response to a client browser. The routine begins at step 300 to create a table format object called JSPTableFormat("tableFormatter"). This object is created during the process of authoring the page. In particular, at step 302, the page author sets up properties on the tableFormatter object including a rawDataGetter, table fields ("method/path"), headerNames, formatbeans, and table attributes. Step 302 may occur upon each client request; alternatively, the table format object or portions thereof may be cached for reuse. As will be described in more detail below, the rawDataGetter is an interface that is used to enable data sources from multiple sources to be sourced into the table format object. In particular, the rawDataGetter provides a generic interface by which third parties can use to plug in different ways of getting data out of varying data sources. The tableFields is a vector that is passed in to the methods of the tableFormatter to specify the paths that the rawDataGetter is to use to get the data from the data source. The headerNames identifies the table header names, and the formatbeans are used to set dates, numbers and the like. The table attributes may also be set either conditionally or unconditionally. The setting of conditional table attributes for a given cell enables the table format object to highlight a given cell upon a given occurrence, as will be seen.

Figure 4:
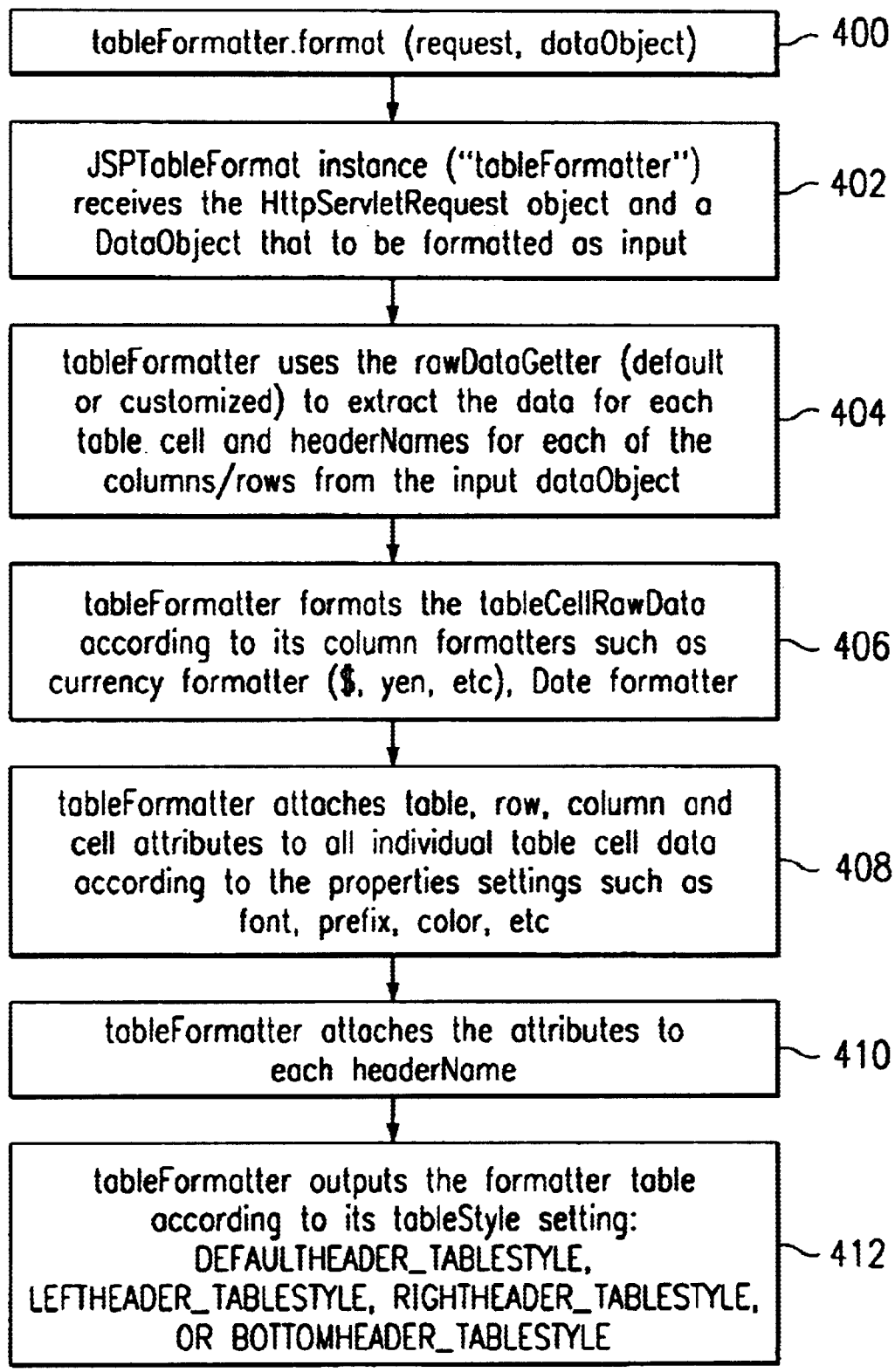
FIG. 4 is a detailed flowchart illustrating the operation of the table format object in response to a page request received at a server.

Returning back to the figure, the high level routine then continues at step 304. At this step, the table format object is executed in response to a client request to format the HTML table for the dynamic page being generated. In particular, the request object and the data object (the data source) to be formatted are passed in to the tableFormatter, which then formats the table for use in the page. Thus, at runtime, the routine responds to the client request to the .jsp servlet, creates the HTML table and populates the table according to the properties set (at step 302) in the table format object. This functionality, described as tableFormatter.format (request, dataObject), is described in more detail in the flowchart of FIG. 4.

The routine begins at step 400 in response to the client request. At step 402, an instance of the table format object receives the HttpServletRequest object and a dataObject that is to be formatted as input. At step 404, the table format object uses the rawDataGetter (as will be described below) to extract from the dataObject the data (from the specified data source) for each table cell and the headerNames for each of the columns and rows in the table. The routine then continues at step 406 with the table format object formatting the tableCellRawData according to its column formatters, which may include, for example, currency formatter ($, yen, or the like), date formatter, and the like. Step 406 may be effected using one or more formatbeans. The routine then continues at step 408 with the table format object attaching table, row, column and cell attributes to all individual table cell data according to the properties settings, which may include, for example, font, prefix, color, highlights, and the like. Among other things, this step allows conditional highlighting of given cell data on a per attribute basis. At step 410, the table format object attaches the attributes to each HeaderName. The routine then continues at step 412 with the table format object outputting the formatter table according to a tablestyle setting. These settings include, for example, DEFAULTHEADER_TABLESTYLE, LEFTHEADER_TABLESTYLE, RIGHTHEADER_TABLESTYLE, or BOTTOMHEADER_TABLESTYLE. The LEFTHEADER_TABLESTYLE setting rotates the whole table to the left. The RIGHTHEADER_TABLESTYLE rotates the whole table to the left. The BOTTOMHEADER_TABLESTYLE setting rotates the whole table upwards. Using the style settings, the table format object may selectively alter the orientation of the generated table on a dynamic basis. Step 412 completes the processing in response to the client browser request. The result of this process is an HTML table for a dynamically-generated server page.

The following is a more detailed description of several of the features of the inventive table formatter.

JSP (Java Server Page) Raw Data Getter

As described above, to produce a formatted table, one must first obtain the data from input object(s). The way to access the data typically is different depending on the implementation of those objects. The rawDataGetter interface of the present invention provides a technique that separates the method of gathering raw data for a dynamic page from the steps necessary to format the data. This interface allows developers to access data in the way they want, and then to apply formatters (e.g., Java base classes) on the raw data. In particular, the rawDataGetter interfaces multiple data sources to the table format object so that third parties may plug in different ways to get their data out of various types of data object(s).

In a preferred embodiment, raw data is accessed using the so-called JSPTableRawDataGetter interface, which includes a setter and a getter for tableRawDataGetter on the JSPTableFormatter. A setter enables setting of an object that implements the interface, while a getter enables the retrieving of the last object that was set. A default implementation for the rawDataGetter handles indexed properties or collections. The interface may also include rawDataGetters for accessing data via a property path or through multiple Java objects such as JavaBeans. These rawDataGetters cover a large number of cases. For special cases, developers may customize the rawDataGetter to read their special input objects. As a result, page developers thus implement the input to suit their design and provide the implementation of the JSPTableRawDataGetter to access their input inside a JSPTableFormat Class.

The following is the JSPTableRawDataGetter interface that a third party may implement to obtain raw data from its data sources:

```
public interface JSPTableRawDataGetter
extends Serializable
{
    /**
     *@param object the data object for formatting.
     *@param tableFieldTokens a vector of fields in a table.
     *@return a two dimensional array of object.
     */
    public Object[ ][ ]
    getTableRawData(Object object,
        Vector tableFieldTokens);
    /**
     *@param object the data object for formatting.
```

```
 *@param tableFieldTokens a vector of fields in a table.
 *@param preferHeaders an array of customized header
    names.
 *@return an array of header strings.
 */
 public String[ ]
 getTableRawDataHeader(Object object,
     Vector tableFieldTokens,
     String[ ] preferHeaders);
 public boolean
 acceptType(Class aClass);
}
```

The following code represents an illustrative implementation for the interface:

```
Public class SimpleRawDataGetter implements JSPTableR-
    awDataGetter
{
public Object [ ] [ ]
getTableRawData (Object object,
    Vector tableFieldTokens)
{
    return (Object [ ] [ ]) object;
}
public String [ ]
getTableRawDataHeader (Object object,
    Vector fieldTokens,
    String [ ] headerNames)
{
    return headerNames;
}
public bookean
acceptType (Class aClass)
{
    if (aclass.equals (Object [ ] [ ] .class)) {
       return true;
    }
    return false;
}
}
```

In this example, the getTableRawData method creates a two-dimensional array of objects for the table and then loops through a vector of data field tokens to obtain the entries. The getTableRawDataHeader method then passes in the data object, the column indicators and the preferred header names (unless the data object dictates otherwise). It should be noted that the implementation of JSPTableRawDataGetter to allow JSPTableFormat to accept a two dimensional array is not meant to be limiting. This embodiment is shown merely to illustrate how easy it is to extend the JSPTableFormat bean to accept new object types. A page developer may readily supply implementations for other data source inputs including, without limitation, JDBC ResultSets or SQLJ Cursors.

Thus, the raw data acquisition interface affords developers freedom to gather data in the way they want and to populate dynamic HTML tables with that data. Unlike the prior art, developers do not need to change their design to use the table formatter. If, for example, they use standard Java beans as their data beans, the default rawDataGetter can be used. Moreover, the interface provides flexibility to enable the developer to implement a custom way of accessing data. Thus, for example, if one wants to obtain data from a given database, all the developer need do is to write his or her own rawDataGetter Java object. This developer-defined rawDataGetter object, which may be identified as JSPData-BaseRawDataGetter java, then implements the JSPTableR-awDataGetter to carry out the three methods in the interface. Those methods then obtain the data for a table and its headers. Thus, to activate the rawDataGetter in the JSPTableFormatter, the developer simply adds the above-illustrated code in his or her .jsp page. When the page request is received, the table formatter formats the data obtained from the JSPDataBaseRawDataGetter defined by the page developer. In this way, the invention provides an interface that can be used by third parties to plug-in ways to get data out of well-known or specialized data objects.

Highlight Certain Cells in Dynamic HTML Table

The present invention also enables a page author to establish conditions under which a given cell's data may be highlighted in some manner. In a simple example, if the page being returned includes an online bank statement, a table cell identifying the customer's checking account may be selectively highlighted if the data therein indicates that the account has less than a given amount (e.g., below $500). The purpose of conditionally highlighting given cell data is to draw the user's attention to the field.

To accomplish this function, the table formatter implements very flexible row, column and cell prefix/suffix property methods. These methods allow page developers to overwrite default values and to specify the row number or column number in the dynamic table to set extra property information for a cell that satisfies a given condition. Preferably, this condition is then checked every time the dynamic page is formatted.

As noted above, the JSPTableFormatter formats dynamic data and produces the HTML table. Developers can extend the get prefix/suffix methods for row, column and cell in the table format object to dynamically control cells that satisfy given conditions. The following is illustrative code (a MyTableFormat object or bean) that may be used for this purpose. This code highlights any cell in any column of the table if the value for that cell is less than zero. Of course, this is merely an illustrative condition.

```
public class MyTableFormat
extends JSPTableFormat
{
    public String
    getCellPrefix(int[ ] order,
       int row,
       int column,
       Object obj)
    {
       if (column ==3){double amount=((AccountSummary)
          obj).getItemAmount(row);
          if (amount<0){return "<font size=3 color=red>";
          }
       }
       return "";
    }
    public String
    getCellSuffix(int[ ] order,
       int row,
       int column,
       Object obj)
    {
       if (column ==3){
       double amount=((AccountSummary) obj)
          .getItemAmount(row);
          if (amount <0){
          return "</font>";
          }
```

```
        }
        return "";
    }
}
```

FIGS. 5A and 5B illustrate a page with highlighted table cells that demonstrates the results of using the JSPTableFormat and MyTableFormat beans. With the same set of data, the first table (FIG. 5A) is formatted using JSPTableFormat bean, and the second table (FIG. 5B) is formatted using MyTableFormat bean above. The MyTableFormat bean extends the base JSPTableFormat bean. As a result, the MyTableFormat bean has all the functionality of the JSPTableFormat bean together with the additional functionality in that it also dynamically controls the cells in the fourth column of the output table. In particular, when a value in a cell of the fourth column is less than 0, then that data is highlighted in red. In this example, two cells in the fourth column are satisfied by this condition, and so the data are in red.

Thus, according to the invention, the page designer may specify how to convert dynamic data (such as the result of a database query or an application transaction) into a f6rmatted tabular representation in which certain table cells are conditionally highlighted based on the characteristics of the dynamic data to be presented in that cell.

Rotation for JSP (Java Server Page) Formatted Table

As noted above, another feature of the table format object provides for the generation of a single JSP that renders a table correctly irrespective of the table's desired orientation. This is achieved by associating all the attributes, prefixes and suffixes for an individual cell. Prefixes and suffixes are any starting and ending HTML tags that are used in a given cell, column, row or header to format the respective contents thereof. Thus, for example, if the developer wants to make a given cell red, the prefix would be <font color=red>and the suffix would be </font>. All the table row, table column and table cell attributes, prefixes and suffixes are "associated" with a particular cell by performing a union operation on the attributes, the row prefixes and suffixes, the column prefixes and suffixes, and the table prefixes and suffixes. Using the table format object, the table attributes, row attributes, column attributes, prefixes and suffixes are then prioritized in the event of overlap. In particular, the cell data (that is subject to the union operation) is ordered according to the priority that is specified on the table format object. This data is then maintained in association with the particular cell so that, when the whole table is rotated, the data stays with the cell. The data of highest priority are then expressed.

To produce a desired table rotation, the page developer then sets a table rotation property in the table format object. In particular, the tableStyle property may be set to one of a given set of variants including, without limitation, DEFAULTHEADER_TABLESTYLE, LEFTHEADER_TABLESTYLE, RIGHTHEADER_TABLESTYLE or BOTTOMHEADER_TABLESTYLE. The first property provides a default action. As noted above, the LEFTHEADER_TABLESTYLE setting rotates the whole table to the left. The RIGHTHEADER_TABLESTYLE rotates the whole table to the left. The BOTTOMHEADER_TABLESTYLE setting rotates the whole table upwards.

FIGS. 6A–6D illustrate a page with rotated tables. This page consists of a number of tables using the same set of data. FIG. 6A illustrates a default header that is generated using the DEFAULTHEADER_TABLESTYLE property. FIG. 6B illustrates the table with the BOTTOMHEADER_TABLESTYLE property set. FIG. 6C illustrates the table with the LEFTHEADER_TABLESTYLE setting. Finally, FIG. 6D illustrates the table with the RIGHTHEADER_TABLESTYLE property setting. As can be seen, because all the properties for a table are associated with individual cells, the setting of the table style property on the table object formatter in the .jsp file generates the desired result.

JSPTableFormat

As described above, the JSPTableFormat bean formats data into an HTML table. The data object can be any form of a JavaBean or other similar object. In a preferred embodiment, the default implementations require that the data object be an Iterator or List of data beans implemented using properties (excluding indexed properties), or the data object may be a JavaBean implemented using indexed properties, where each index value represents a row in the table. As noted above, one can implement the JSPTableRawDataGetter interface to obtain the table raw data from customized data beans.

Preferably, there are three ways to useJSPTableFormat. One way is to create a JSPTableFormat instance in the .jsp file, set up the all necessary attributes on the instance, and then call format method on the instance. This technique was illustrated generally in the flowchart of FIG. 2. The second way is to produce a serialized bean manually, use a JSPLookup object to obtain an instance in .jsp file, setup the additional properties if required, and call format method on the instance. The third way is the simplest—using a tableFormat customizer to setup properties visually, saving the settings as a given file type (e.g., a.ser file). Then, use JSPLookup to obtain an instance in .jsp file, and call format method on this instance. Each of the techniques is now described.

Create and setup JSPTableFormatter on .jsp file:

The following is a representative table format object illustrating how properties are set on the table format object:

```
. . .
<%
JSPTableFormat table=new JSPTableFormat( );
table.setTableAttributes("bgcolor=#cccccc align=center
    border=0");
table.setHeaderAttributes("BGCOLOR=#b0c4de");
table.setTableStyle(JSPTableFormat.LEFTHEADER_
    TABLESTYLE):
table.setFields("itemWithdrawal,itemBalance,itemDeposit,
    itemAmount,itemDate");
table.setFormatString("NumberFormatCurrency,
    NumberFormatCurrency,NumberFormatCurrency,N
    umberFormatCurrency,DateFormatshort"); %><%=table
    format(request, account) %>
```

In this approach, an instance of JSPTableFormat is created, and the table attributes, header attributes, and table style are then set up. Thereafter, the fields on the table are established. Each field on the table preferably represents a property on the dataObject. Then, the format bean for each field is established according to its data type. Finally, the table.format(HttpServletRequest, Object) method is used to format the bean "account" into an HTML table according to the properties in the table instance. In an illustrated example, "request" is the HttpServletRequest that provides default locale information, and "account" is the data bean used that consists of the following indexed properties: getItemWithdrawal(int) getItemBalance(int) getItemDeposit (int) getItemAmount(int) getItemData(int) getItemDescription(int) . . .

The second technique for using the JSPTableFormat bean is now described. This technique begins by creating an instance of the JSPTableFormat bean, setting some properties, and then serializing the object into a file called, for example, MyLeftheaderTable. In the .jsp file, the following is then provided:

```
. . .
<% JSPTableFormat table=
JSPTableFormat)JSPLookup.getBean
   ("com.ibm.jsp.MyLeftHeaderTable"); %>
<%=table.format(request, account) %>
```

First, the table instance is obtained from the serial file, for example, by using JSPLookup.getBean( ). Then, the table.format(HttpServletRequest, Object) method formats the bean "account" into an HTML table according to the properties in the table instance. In this case, the .jsp file may look as follows:

```
protected void
buildingSerFile( )
{
JSPTableFormat table=new JSPTableFormat( );
table.setTableAttributes("bgcolor=#cccccc align=center
   border=0");
table.setHeaderAttributes("BGCOLOR=#b0c4de");
table.setTableStyle(JSPTableFormat. LEFTHEADER_
   TABLESTYLE);
table.setFields("itemWithdrawal,itemBalance,itemDeposit,
   itemAmount,itemDate");
table.setFormatString("NumberFormatCurrency,
   NumberFormatCurrency,NumberFormatCurrency,N
umberFormatCurrency,DateFormatshort");
try{
FileOutputStream fileOutputStream=new FileOutputStream
   (path+"/"+"MyLeftHeaderTable");
ObjectOutputStream out=new ObjectOutputStream
   (fileOutputStream);
out.writeObject(jspTableFormat);
out.flush( );
fileOutputStream.close( );
}catch (Exception e){
e.printStackTrace( );
throw new Error("Unable to produce .ser file");
}
}
```

The two techniques described above produce the same table. Nevertheless, if an attribute value is misentered, the table may not look as the developer intended. Worse, if a property name for a field is not entered correctly or a format string for a data type is mismatched, the table may not be generated at all. To overcome these difficulties, the third technique involves use of a FormatBeanCustomizer that allows the developer to set up all attributes visually and then save the result to a serialized file. The table may then be created by the following .jsp file:

```
. . .
<% JSPTableFormat table=
JSPTableFormat)JSPLookup.getBean
   ("com.ibm.jsp.MyLeftHeaderTable"); %>
<%=table.format(request, account) %>
```

JSPTableFormatCustomizer

As is well known, the JSP Format Bean Library consists of a rich set of helper beans supporting JSP scripting. It makes tedious or complex operations very simple to code. With the JSPTableFormatCustomizer, the page author can instantiate a sophisticated dynamic table by modifying a single line of code in the .jsp template to point to a serialized table formatter. In addition, the page author can extend the JSPTableFormat to format any type of data in any way that is desired.

To produce a sophisticated table, the developer may configure a set of properties on the JSPTableFormat bean as has been described. The JSPTableFormatCustomizer is a tool that simplifies this formatting.

The JSPTableFormatCustomizer makes JSPTableFormat configuration very simple. The developer visually configures his or her dynamic table to produce a similarly patterned JSP table.

FIG. 7 illustrates a representative layout of the JSPTableFormatCustomizer. As can be seen, the GUI 700 is presented in table form. The table is divided into three regions. The region 702 on the left includes the row properties. The region 704 on the top includes table, column, and header properties. The region 706 in the bottom-right represents the dynamic table data. Each cell on the table allows the developer to configure the corresponding attributes of the dynamic table. For illustrative purposes, there are preferably six types of cells: TableInfo, ColumnProperty, HeaderRow, HeaderName, Row, and dynamic data In each of the six types of cells the developer may set color, font size, text style (normal, bold, italics), and alignment (right, left, center). For the dynamic data and HeaderName cells, preferably these attributes only affect the current cell. For the ColumnProperty, Row/HeaderRow, and TableInfo, preferably the attributes affect the cells in the column, row, or table, respectively. Preferably, the final color of the cell is used by the table formatter in the JSP page.

Preferably, the TableInfo cell gives the developer control over an entire table. As noted above, the TableStyle cell allows the developer to rotate the layout of the table at JSP runtime. To select a Data Object, the user first selects DataObject Property Type and then clicks the Browse button. The user may then select a class file from the file dialog as the data object. The indicated properties of the selected data object are now available to choose in the ColumnProperty cells. The Reset button resets the whole table. The ColumnProperty cell allows the developer to specify the object properties or index properties that will fill that column's data cells. After the developer has chosen an object property to represent a column, then he or she may chose an appropriate FormatBean to format the data. For example, if the property assigned to this column is a float, one could format the value with the NumberFormatGeneral, NumberFormatCurrency, NumberFormatPercent, or the String, but not, for example, with the DateFormat bean.

If the Header Location in the TableInfo cell is Top or Bottom, then the HeaderRow allows the developer to specify a repeating header. The HeaderName cell allows the developer to name each column. The dynamic data, HeaderName, Row, and HeaderRow preferably only have customizable color, font, and alignment attributes.

When the developer has completed the process, the customization may be saved in two ways, Save as .ser, and Verbose Save. The Save as .ser produces a serialized file of the customized JSPTableFormat bean. It also provides a skeleton JSP file that instantiates an instance using JSPLookup and calls format on the data object that the developer needs to provide (and which is obtained through the rawDataGetter):

Partial JSP output from Save as .ser

```
<%
JSPTableFormat jspTableFormat=(JSPTableFormat)
JSPLookup.lookup
    ("com.ibm.jsp.samples.AccountSummaryTable");
%>
<%=jspTableFormat.format(request, dynamicData) %>
```

The Verbose Save produces a JSP page with the JSPTableFormat bean and properties set just as if the developer had written the code directly:

Listing 2. Partial JSP output from Verbose Save

```
<%
JSPTableFormat jspTableFormat=new JSPTableFonnat( );
jspTableFormat.
setTableAttributes("BGCOLOR=#c8c8c8 ALIGN=
    CENTER BORDER=0");
jspTableFormat.setHeaderOn(true);
jspTableFormat.setTableStyle
(JSPTableFormat.LEFTHEADER_TABLESTYLE);
jspTableFormat.setHeaderAttributes
("BGCOLOR=#00cccc ALIGN=CENTER");
jspTableFormat.setHeaderPrefix("<B>");
jspTableFormat.setHeaderSuffix("<B>");
String[ ] headerCellNames=new String[4];
headerCellNames[0]="";
headerCellNames[1]="Withdrawal";
headerCellNames[2]="Deposit";
headerCellNames[3]="Date";
jspTableFormat.setHeaderCellNames(headerCellNames);
Vectorfields=new Vector( );
fields.addElement("ItemLabel");
fields.addElement("itemWithdrawal");
fields.addElement("itemDeposit");
fields.addElement("itemDate");
jspTableFormat.setVectorFields(fields);
String[ ]formatBeanNames=new String[4];
formatBeanNames[0]="";
formatBeanNames[1]=
    "com.ibm.jsp.NumberFormatCurrency";
formatBeanNames[2]=
    "com.ibm.jsp.NumberFormatCurrency",
formatBeanNames[3]="com.ibm.jsp.DateFormatLong";
jspTableFormat.setFormatBeans(formatBeanNames);
String[ ] columnAttributes=new String[4];
columnAttributes[0]="BGCOLOR=#00cccc ALIGN=
    CENTER";
columnAttributes[1]="BGCOLOR=#ffffcc ALIGN=
    RIGHT";
columnAttributes[2]="BGCOLOR=#ffccff ALIGN=
    RIGHT";
columnAttributes[3]="BGCOLOR=#ccffcc ALIGN=
    CENTER";
jspTableFormat.setColumnAttributes(columnAttributes);
%>
<%=jspTableFormat.format(request, dynamicData) %>
```

For illustrative purposes, the state of the customizer tool for the above code listing is shown in FIG. 7, and the respective dynamic table is shown in FIG. 8.

Table Attribute Chart Linking to Table Format Object Documentation

For a Java programmer who is not an HTML expert, it is not always easy to completely understand the behaviors of the attributes in a dynamic table that is going to be manipulated, for example, by conditional cell highlighting, horizontal or vertical rotation, or the like. Typically, a page author or programmer has available documentation that contains the HTML table attributes, but this documentation does not show the relations of the attributes. Thus, the documentation is not at all useful if the developer is attempting to understand the attribute behaviors and the potential for conflict.

The present invention addresses this deficiency in the art by generating a so-called table attribute chart, which includes a visual representation of what the output of the dynamic table will look like, and then linking each attribute in the chart to given information (about the attribute) in the table format object's documentation. Preferably, both the table attribute chart and the table format object's documentation are available in a markup language (such as HTML) and are accessible via conventional viewing software, e.g., a web browser (e.g., Netscape Navigator, Internet Explorer, or the like). Linking between the table attribute chart elements and the corresponding data and information in the format object's documentation using conventional hypertext anchors.

FIG. 10 illustrates a representative table attribute chart. As can be seen, the table attribute chart shows the position and the precedence of the attributes relative to each other. The chart is a visual representation of how the dynamic table will be output in response to a given page request to the server. As can be seen, the various elements of the table attribute chart include hypertext anchors (as represented by the underscoring) that represent links to information in the table format object's documentation that is related to the table element. Thus, for example, a link in the table attribute chart for the columnPrefix attribute is linked to a portion of the table formatter documentation that describes the particular get and set column prefix methods that operate on the .jsp table format object. FIG. 11 illustrates the linked portion of the table format object documentation. As can be seen in this figure, this portion of the table format object also includes links back to the table attribute chart. This "bi-directional" linking is a technical advantage of the present invention in that it enables the programmer to be able to switch quickly back and forth between, on the one hand, the table attribute chart and, on the other, the table format object's documentation, which describes all the methods and variables used on that object, as well as the descriptions of how those methods and variables are use by a programmer to instantiate the table format object according to the present invention.

In a preferred embodiment, the bidirectional linking between the table attribute chart and the table format object documentation is effected using bidirectional links that conform to the World Wide Web Consortium's XML Linking Language, commonly referred to as XLink. XLink describes the use of so-called multidirectional links. A multidirectional link is a link whose traversal can be initiated from more than one of its participating resource. A participating resource is a resource that belongs to a link. In the context of the present invention, the table attribute chart and the table format object documentation are each participating resources, and the link is bidirectional as described above.

Linking between the table format object documentation (called JSPTableFormatterjavadoc) and the table attribute chart maps the table attribute property methods to HTML table attribute definitions visually. From the javadoc to the chart, one can see how the table attribute property methods affect the HTML table. From the chart to the javadoc, the developer can ascertain which property needs to be set to produce a desired table. This technique affords the developer a clear view of the attribute behaviors as well as information about how to resolve potential conflicts.

The technique of establishing bidirectional links between a set of data representations may be generalized beyond the use with the dynamic table documentation as described above. More generally, it is known that technical documentation must explain concepts that are best communicated using very different presentations. For example, one concept might be best communicated with a graphic representation that shows relationships (such as ordering constants) between different elements of the topic of concern. Another concept might be best communicated in a text description in which each element in the topic of concern is separately discussed. The present invention provides a technique to leverage hypertext linking (such as is supported in HTML web browsers) to allow the reader to navigate electronically between the different presentation formats thus allowing the reader (the page developer) to navigate electronically between these formats. This allows the developer to produce different presentation of concepts concerning a particular element of the topic of concern more efficiently. As a result, the quality of the presentation and the reader's understanding of the material is improved.

As noted above, the inventive table formatter mechanism is preferably implemented in or as an adjunct to a web server. Thus, the invention does not require any modifications to conventional client hardware or software. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

What is claimed is:

1. A method, operative at a server, for generating a table having dynamic data, comprising the steps of:

including executable code for a table format object in a document containing markup language;

receiving a request from a client for the document;

responsive to the received request, instantiating a table format object with dynamic data extracted from one of a set of data objects through a pluggable interface, wherein the pluggable interface has been customized with a developer-supplied data getter object to access a custom data object; and formatting the dynamic data into a table according to the table format object by modifying markup language in the document for the table.

2. The method as described in claim 1 wherein the pluggable interface provides a method for accessing data via a property path.

3. The method as described in claim 1 wherein the pluggable interface provides a method for accessing data via a set of Java objects.

4. The method as described in claim 1 wherein the step of formatting the dynamic data includes attaching table, row, column, and cell attributes to the table.

5. The method as described in claim 1 wherein the markup language is HyperText Markup Language (HTML).

6. The method as described in claim 1 further including the step of returning the document to a requesting browser.

7. A computer program product in a omputer useable medium for use in a data processing system for generating a table having dynamic data, the computer program product comprising:

means for including executable code for a table format object in a document containing markup language;

means for receiving a request from a client for the document;

means responsive to the received request for instantiating the table format object with dynamic data extracted from one of a set of data objects through a pluggable interface, wherein the pluggable interface has been customized with a developer-supplied data getter object to access a custom data object; and means for formatting the dynamic data into a table according to the table format object by modifying markup language in the document for the table.

8. The computer program product as described in claim 7 wherein the pluggable interface provides means for accessing data via a property path.

9. The computer program product as described in claim 7 wherein the pluggable interface provides means for accessing data via a set of Java objects.

10. The computer program product as described in claim 7 wherein the means for formatting the dynamic data includes attaching table, row, column, and cell attributes to the table.

11. The computer program product as described in claim 7 wherein the markup language is HyperText Markup Language (HTML).

12. The computer program product as described in claim 7 further including means for returning the document to a requesting browser.

13. A server, comprising:

a processor;

a memory for storing a set of one or more data objects;

means for including executable code for a table format object in a document containing markup language;

means for receiving a request from a client for the document;

means responsive to the received request for instantiating the table format object with dynamic data extracted from one of a set of data objects through a pluggable interface, wherein the pluggable interface has been customized with a developer-supplied data getter object to access a custom data object; and means for formatting the dynamic data into a table according to the table format object by modifying markup language in the document for the table.

14. The server as described in claim 13 wherein the pluggable interface provides means for accessing data via a property path.

15. The server as described in claim 13 wherein the pluggable interface provides means for accessing data via a set of Java objects.

16. The server as described in claim 13 wherein the means for formatting the dynamic data includes attaching table, row, column, and cell attributes to the table.

17. The server as described in claim 13 wherein the markup language is HyperText Markup Language (HTML).

18. The server as described in claim 13 further including means for returning the document to a requesting browser.

* * * * *